(12) United States Patent
Ueda et al.

(10) Patent No.: US 12,470,791 B2
(45) Date of Patent: Nov. 11, 2025

(54) ELECTRONIC APPARATUS CAPABLE OF PERFORMING CONTROL BASED ON TEMPERATURE AND CONTROL METHOD

(71) Applicant: CANON KABUSHIKI KAISHA, Tokyo (JP)

(72) Inventors: Yuji Ueda, Tokyo (JP); Jun Kamiya, Kanagawa (JP); Hiroshi Toriumi, Kanagawa (JP); Yuki Kubo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 18/539,530

(22) Filed: Dec. 14, 2023

(65) Prior Publication Data

US 2024/0205526 A1 Jun. 20, 2024

(30) Foreign Application Priority Data

Dec. 20, 2022 (JP) .................................. 2022-203532

(51) Int. Cl.
*H04N 23/52* (2023.01)
*G01K 7/22* (2006.01)
*G01K 13/00* (2021.01)
*H04N 23/63* (2023.01)
*H04N 23/667* (2023.01)

(52) U.S. Cl.
CPC ............ *H04N 23/52* (2023.01); *G01K 13/00* (2013.01); *H04N 23/634* (2023.01); *H04N 23/667* (2023.01); *G01K 7/22* (2013.01)

(58) Field of Classification Search
CPC .... H04N 23/52; H04N 23/634; H04N 23/667; G01K 13/00; G01K 7/22
See application file for complete search history.

(56) References Cited

U.S. PATENT DOCUMENTS

| | | | |
|---|---|---|---|
| 2020/0288048 A1* | 9/2020 | Makara | H05K 7/20209 |
| 2021/0294185 A1* | 9/2021 | Shiozaki | G03B 17/55 |
| 2022/0294955 A1* | 9/2022 | Yoshida | H04N 23/63 |
| 2022/0294957 A1* | 9/2022 | Iwasaki | H04N 23/68 |

FOREIGN PATENT DOCUMENTS

| | | |
|---|---|---|
| JP | 2012-165372 A | 8/2012 |
| JP | 2021-150762 A | 9/2021 |

* cited by examiner

*Primary Examiner* — Kelly L Jerabek
(74) *Attorney, Agent, or Firm* — Cowan, Liebowitz & Latman, P.C,

(57) ABSTRACT

An electronic apparatus includes a plurality of thermometers and a control unit that performs control to restrict an operation of the electronic apparatus in a case where one of the plurality of temperatures has reached the threshold temperature. The control unit performs control to obtain a first difference between the temperature of a heat source and a threshold temperature for the temperature of the heat source and a second difference between the temperature of an outer casing and a threshold temperature for the temperature of the outer casing, correct the first difference based on temperature increase characteristics of the heat source, correct the second difference based on temperature increase characteristics of the outer casing, and display the information based on the corrected first difference or the corrected second difference.

17 Claims, 9 Drawing Sheets

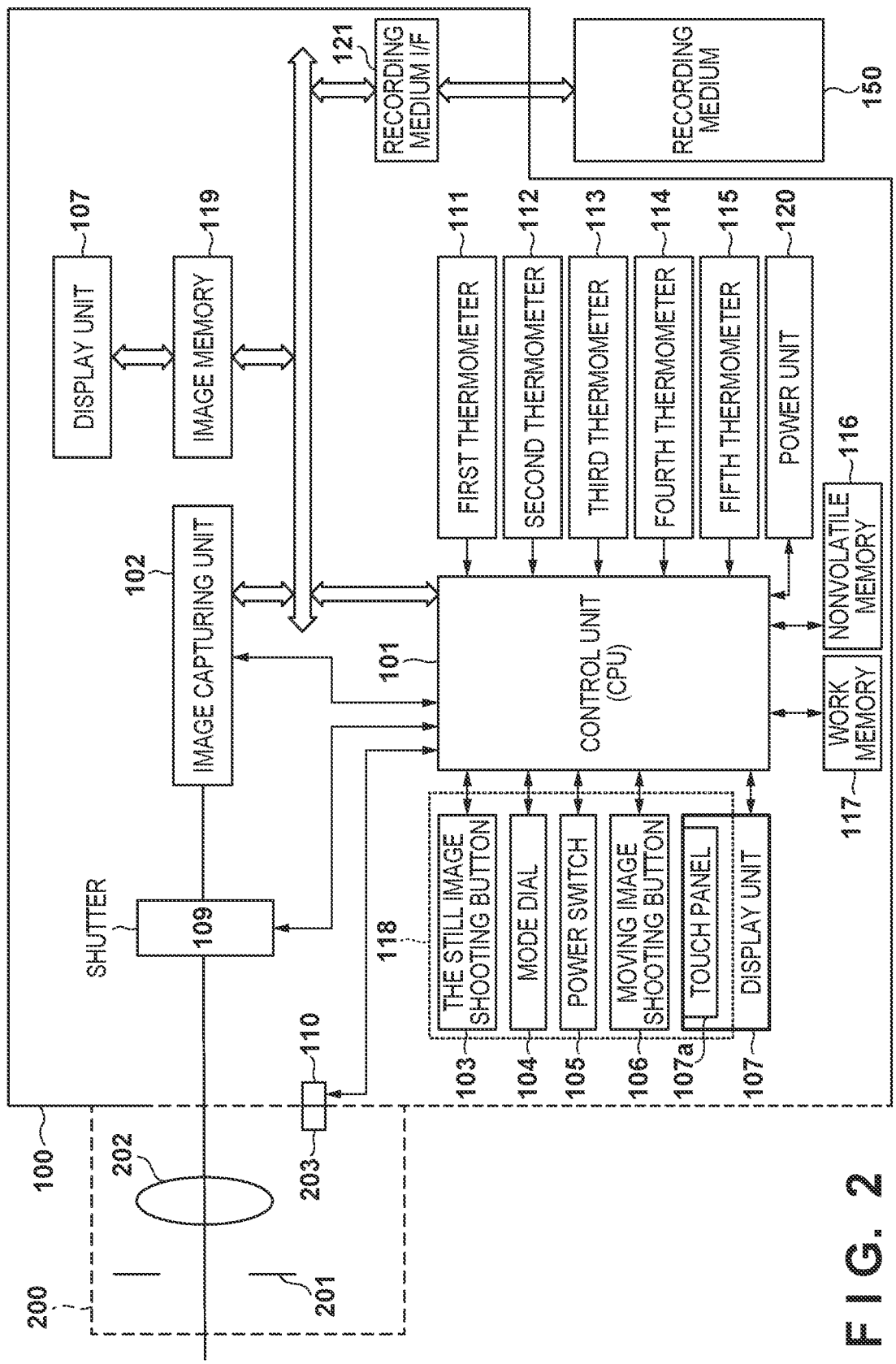
F I G. 2

ELECTRONIC APPARATUS CAPABLE OF PERFORMING CONTROL BASED ON TEMPERATURE AND CONTROL METHOD

BACKGROUND OF THE INVENTION

Field of the Invention

The present invention relates to a technique to control operations based on the temperature of an electronic apparatus.

Description of the Related Art

In an electronic apparatus such as a digital camera, as the load on image capture processing and image processing increases due to, for example, shooting of high-definition images, electronic components (hereinafter, heat source devices) that constitute an image capturing unit, a control unit, and the like generate heat during shooting, and the temperatures of the inside and the outer casing of the device increase. For this reason, it is necessary to perform control to restrict operations of the electronic apparatus so as not to exceed a temperature at which operations of the heat source devices are guaranteed, and to restrict operations of the electronic apparatus so that the temperature of the outer casing, which is touched directly by a user, does not rise excessively.

Furthermore, in a case where the operations of the electronic apparatus are restricted based on an outer casing temperature, it is desirable to notify a user of a situation until an operation restriction temperature is reached. For example, in a case where moving images are intended to be shot continuously by a digital camera for a long duration of time, implementing the restriction on the operations without notification gives rise to an inconvenience where a desired scene cannot be shot, for instance.

It is described in Japanese Patent Laid-Open No. 2012-165372 that a time period until the temperature inside a camera reaches a restriction temperature is calculated at the time of shooting of moving images, and the time period is displayed as a shootable time period. It is described in Japanese Patent Laid-Open No. 2021-150762 that a shootable time period until an operation restriction temperature is reached is predicted and displayed based on a heat source device temperature and an outer casing temperature of a camera that have been obtained during a standby for shooting of moving images.

However, according to Japanese Patent Laid-Open No. 2012-165372, as the ambient temperature in an environment in which a device is used is not taken into consideration, there is a possibility that a difference arises between a shootable time period of which a user has been notified and a time period until shooting is actually stopped in a case where, for example, the ambient temperature has changed during shooting of moving images. In this case, there is an inconvenience where shooting of moving images is stopped earlier than the user has expected, for example.

Furthermore, according to Japanese Patent Laid-Open No. 2021-150762, in a case where the accuracy of prediction of the shootable time period has decreased due to, for example, a change in an environment in which the camera is used, there is a possibility that shooting of moving images is stopped before the restriction temperature is reached, thereby giving rise to an inconvenience where the shootable time period is shortened, for example.

SUMMARY OF THE INVENTION

The present invention has been made in consideration of the aforementioned problems, and realized techniques to provide an appropriate notification indicating a state until an operation restriction is reached while extending an operable time period of an electronic apparatus to the maximum.

In order to solve the aforementioned problems, the present invention provides an electronic apparatus comprising: a plurality of thermometers that detect temperatures at a plurality of positions in the electronic apparatus; a CPU; and a memory which stores a program which, when executed by the CPU, causes the electronic apparatus to function as: a control unit that displays, on a display, information relating to a time period until one of the plurality of temperatures detected by the plurality of thermometers reaches a threshold temperature, and performs control to restrict an operation of the electronic apparatus in a case where one of the plurality of temperatures detected by the plurality of thermometers has reached the threshold temperature, wherein the plurality of thermometers include a thermometer that detects a temperature of a heat source included in the electronic apparatus, and a thermometer that detects a temperature of an outer casing of the electronic apparatus, and the control unit performs control to obtain a first difference between the temperature of the heat source and a threshold temperature for the temperature of the heat source and a second difference between the temperature of the outer casing and a threshold temperature for the temperature of the outer casing, correct the first difference based on temperature increase characteristics of the heat source, correct the second difference based on temperature increase characteristics of the outer casing, and display the information based on the corrected first difference or the corrected second difference.

In order to solve the aforementioned problems, the present invention provides an electronic apparatus comprising: a plurality of thermometers that detect temperatures at a plurality of positions in the electronic apparatus; a CPU; and a memory which stores a program which, when executed by the CPU, causes the electronic apparatus to function as: a control unit that displays, on a display, information relating to a time period until one of the plurality of temperatures detected by the plurality of thermometers reaches a threshold temperature, and performs control to restrict an operation of the electronic apparatus in a case where one of the plurality of temperatures detected by the plurality of thermometers has reached the threshold temperature, wherein the plurality of thermometers include a thermometer that detects a temperature of a heat source included in the electronic apparatus, and a thermometer that detects a temperature of an outer casing of the electronic apparatus, and the control unit obtains a first difference between the temperature of the heat source and a threshold temperature for the temperature of the heat source and a second difference between the temperature of the outer casing and a threshold temperature for the temperature of the outer casing, and displays the information based on a first setting value obtained through comparison between the first difference and a predetermined first control threshold or on a second setting value obtained through comparison between the second difference and a predetermined second control threshold.

In order to solve the aforementioned problems, the present invention provides a control method for an electronic apparatus, the electronic apparatus including a plurality of thermometers including a thermometer that detects a temperature of a heat source included in the electronic apparatus, and a thermometer that detects a temperature of an outer casing of the electronic apparatus, the control method comprising: displaying, on a display, information relating to a time period until one of the plurality of temperatures detected by the plurality of thermometers reaches a threshold temperature; and performing control to restrict an operation of the electronic apparatus in a case where one of the plurality of temperatures detected by the plurality of thermometers has reached the threshold temperature, wherein in the displaying, a first difference between the temperature of the heat source and a threshold temperature for the temperature of the heat source, and a second difference between the temperature of the outer casing and a threshold temperature for the temperature of the outer casing, are obtained, the first difference is corrected based on temperature increase characteristics of the heat source, the second difference is corrected based on temperature increase characteristics of the outer casing, and the information is displayed based on the corrected first difference or the corrected second difference.

In order to solve the aforementioned problems, the present invention provides a control method for an electronic apparatus, the electronic apparatus including a plurality of thermometers including a thermometer that detects a temperature of a heat source included in the electronic apparatus, and a thermometer that detects a temperature of an outer casing of the electronic apparatus, the control method comprising: displaying, on a display, information relating to a time period until one of the plurality of temperatures detected by the plurality of thermometers reaches a threshold temperature; and performing control to restrict an operation of the electronic apparatus in a case where one of the plurality of temperatures detected by the plurality of thermometers has reached the threshold temperature, wherein in the displaying, a first difference between the temperature of the heat source and a threshold temperature for the temperature of the heat source, and a second difference between the temperature of the outer casing and a threshold temperature for the temperature of the outer casing, are obtained, and the information is displayed based on a first setting value obtained through comparison between the first difference and a predetermined first control threshold or on a second setting value obtained through comparison between the second difference and a predetermined second control threshold.

According to the present invention, a notification indicating a state until an operation restriction is reached can be provided appropriately while extending an operable time period of an electronic apparatus to the maximum.

Further features of the present invention will become apparent from the following description of exemplary embodiments (with reference to the attached drawings).

BRIEF DESCRIPTION OF THE DRAWINGS

FIG. 2 is a block diagram showing a configuration of the electronic apparatus according to the present embodiment.

DESCRIPTION OF THE EMBODIMENTS

Figure 1A:
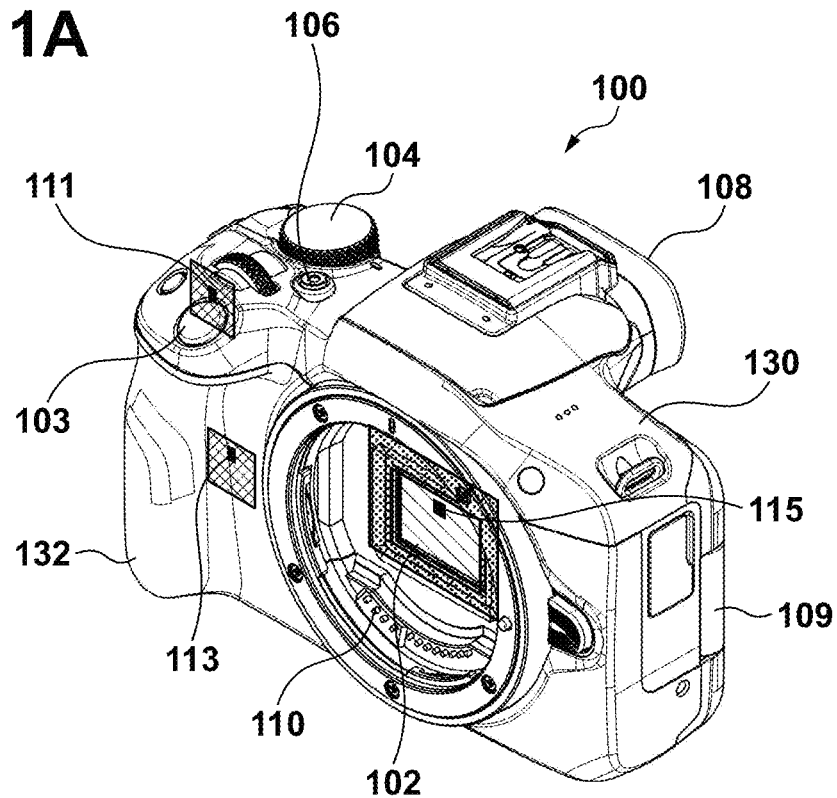
FIGS. 1A and 1B are external views of an electronic apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The following embodiments will be described in relation to a case where an electronic apparatus of the present invention is a hand-held type image capture apparatus, such as a digital camera. Note that the electronic apparatus of the present invention is not limited to the digital camera, and an application to a hand-held type apparatus including a device that acts as a heat source, such as a personal computer (a notebook PC or a tablet PC) and a smartphone, is possible.

First Embodiment

First, the first embodiment according to the present invention will be described.
<Apparatus Configuration>

A configuration and functions of a digital camera 100 according to a present embodiment will be described with reference to FIG. 1A to FIG. 2.

Figure 1B:
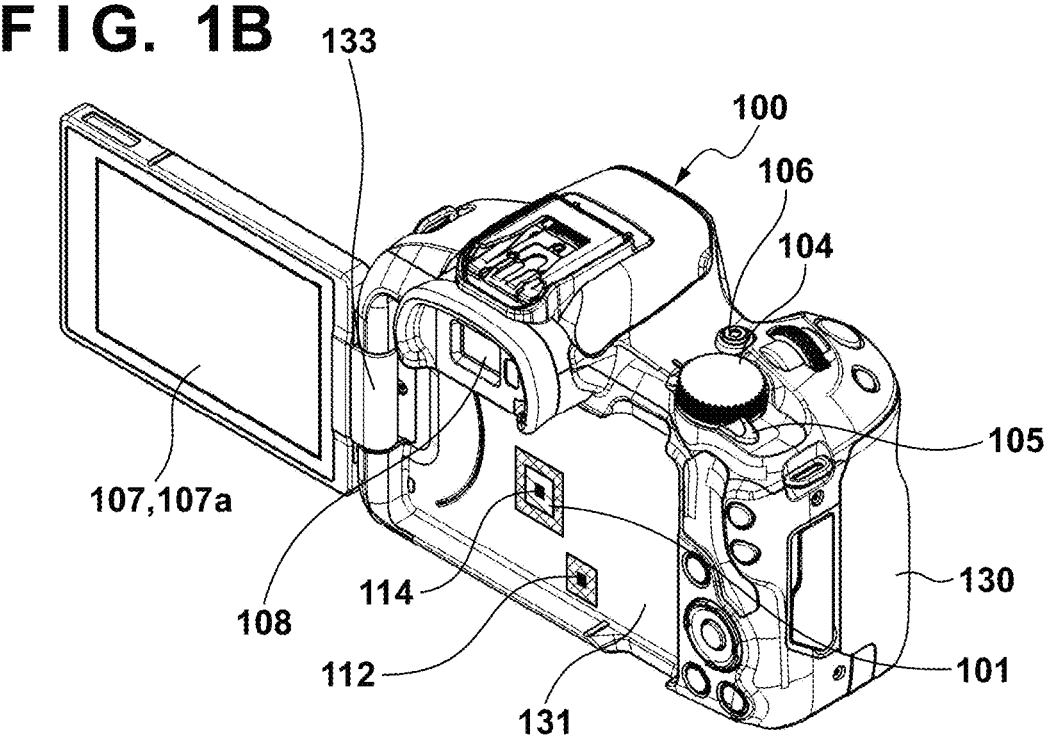

FIG. 1A is a front perspective view of the digital camera 100 in a state where a lens unit 200 has been detached, and FIG. 1B is a rear perspective view of the digital camera 100.

The digital camera 100 includes a control unit 101 and an image capturing unit 102 that are mounted on a substrate arranged inside a housing of a camera body 130, a still image shooting button 103, a mode dial 104, a power switch 105, a moving image shooting button 106, a display unit 107, and an eyepiece unit 108 that are arranged on an outer casing of the camera body 130. Furthermore, the digital camera 100 includes a first thermometer 111, a second thermometer 112, a third thermometer 113, a fourth thermometer 114, and a fifth thermometer 115.

The control unit 101 includes a processor that executes computational processing and control processing related to the digital camera 100, such as a CPU. The image capturing unit 102 is an image sensor comprised of an image capturing element that converts a subject image into electrical signals, such as a CCD and a CMOS.

The still image shooting button 103 is a push-button operation member for issuing an instruction for still image shooting processing to the control unit 101.

The mode dial 104 is a rotary operation member for switching among various types of modes. The mode dial 104 can switch from a plurality of operation modes of the control unit 101 to a still image shooting mode or a moving image shooting mode.

The power switch 105 is a rotary operation member that switches between ON and OFF of the power of the digital camera 100.

The moving image shooting button 106 is a push-button operation member for issuing an instruction for starting or stopping moving image shooting processing (recording processing) to the control unit 101. The control unit 101 starts the moving image shooting processing in response to initial pressing of the moving image shooting button 106, and continues the moving image shooting processing until the moving image shooting button 106 is pressed again. Also, the control unit 101 stops the moving image shooting processing when the moving image shooting button 106 is pressed again, and records moving images corresponding to a time period from the start to the stop of the shooting processing into a recording medium 150.

The display unit 107 includes, for example, a liquid crystal panel or an organic EL panel provided on a rear surface side of the camera body 130, and displays images and various types of information so that they can be viewed by a user. The display unit 107 has an electronic viewfinder (EVF) function that displays live-view images captured by the image capturing unit 102. Furthermore, the display unit 107 has an electronic viewfinder (EVF) function that reproduces shot still images and displays moving images that are currently recorded. The display unit 107 is a vari-angle monitor which is rotatably connected to the camera body 130 via a hinge unit 133, and which is positionally variable relative to the camera body 130. The user can freely change the direction and angle of, or rotate, a display surface of the vari-angle monitor relative to the digital camera 100. Note that the display unit 107 is not limited to the above-described vari-angle type, and may be of a tilt type which allows rotation in an up-down direction (around a horizontal axis perpendicular to an optical axis) using the hinge unit 133 as a rotation shaft, and which allows the display surface to tilt relative to a vertical direction.

FIG. 1A shows a state where the display unit 107 is at a "closed position". The "closed position" is a stored form where the display surface of the display unit 107 has been closed so as to face a rear surface cover 131 of the camera body 130. FIG. 1B shows a state where the display unit 107 is at an "open position". The "open position" is an open form where the display unit 107 has been opened toward the outside of the camera body 130 from the "closed position", and the display surface faces the same direction as the rear surface cover 131 of the camera body 130 (a direction opposite to the non-illustrated lens unit).

Furthermore, the display unit 107 includes a touch panel 107a. The touch panel 107a includes a touch sensor capable of detecting a contact (a touch operation) made on the display surface of the display unit 107 (an operation surface of the touch panel 107a).

The eyepiece unit 108 is a look-through type eyepiece viewfinder. Via the eyepiece unit 108, the user can confirm the focus and composition of a subject in an image captured by the image capturing unit 102.

A communication terminal 110 is an electrical contact point that is intended for the digital camera 100 to communicate with the later-described lens unit 200.

The first thermometer 111 detects a first ambient temperature T1 in an environment in which the camera body 130 is used. The first thermometer 111 includes a temperature sensor such as a thermistor. The first thermometer 111 is arranged at a first position distanced from the control unit 101 and the image capturing unit 102, which are heat-generating devices (hereinafter, heat source devices) arranged inside the housing of the camera body 130 (e.g., in the vicinity of the still image shooting button 103).

The second thermometer 112 detects a second ambient temperature T2 in an environment in which the camera body 130 is used. The second thermometer 112 includes a temperature sensor such as a thermistor. The second thermometer 112 is arranged at a second position distanced from the control unit 101 and the image capturing unit 102, which are the heat source devices arranged inside the housing of the camera body 130 (e.g., on the inner surface side of the rear surface cover 131 of the camera body 130).

The first thermometer 111 is arranged at a position that is at a farther distance from the control unit 101 and the image capturing unit 102, which are the heat source devices, than the second thermometer 112 is.

The third thermometer 113 detects an outer casing temperature T3 of the camera body 130. The third thermometer 113 includes a temperature sensor such as a thermistor. The third thermometer 113 is arranged so that a correlation can be attained between the outer casing temperature T3 and the temperature of a position that exhibits the highest temperature due to heat generation of the heat source devices in a section in which the user touches the camera body 130 to hold the digital camera 100. For example, the third thermometer 113 is arranged in the vicinity of a grip 132.

The fourth thermometer 114 and the fifth thermometer 115 are device temperature detection sensors that detect device temperatures associated with heat generation of the heat source devices.

The fourth thermometer 114 detects a fourth device temperature T4, which is the temperature of the control unit 101 that represents a heat source device. The fourth thermometer 114 includes a temperature sensor such as a thermistor. The fourth thermometer 114 is mounted on a substrate which is arranged inside the housing of the camera body 130 and on which the control unit 101 is mounted. The fourth thermometer 114 is arranged in the vicinity of the control unit 101. The temperature T4 detected by the fourth thermometer 114 increases with heat generation of the control unit 101 that represents a heat source device.

The fifth thermometer 115 detects a fifth device temperature T5, which is the temperature of the image capturing unit 102 that represents a heat source device. The fifth thermometer 115 includes a temperature sensor such as a thermistor. The fifth thermometer 115 is arranged inside the housing of the camera body 130, and in the vicinity of the image capturing unit 102. The temperature T5 detected by the fifth thermometer 115 increases with heat generation of the image capturing unit 102 that represents a heat source device.

The amounts of heat generation of the control unit 101 and the image capturing unit 102 are proportional to power consumed by the control unit 101 and the image capturing unit 102. Power consumed by the control unit 101 and the image capturing unit 102 varies depending on an operation mode of the digital camera 100. For example, power consumed during shooting of moving images at a high frame rate (e.g., 120 fps is higher than power consumed during shooting of moving images at a low frame rate (e.g., 60 fps). Therefore, the amounts of heat generation of the heat source devices during shooting of moving images at a high frame rate are larger than those during shooting of moving images at a low frame rate. Also, during shooting of moving images, the temperature inside the housing of the digital camera 100 increases with the elapse of time. Furthermore, during shooting of still images, consumed power is low and the amounts of heat generation of the heat source devices are small compared to those during shooting of moving images at a high frame rate, although they vary depending on, for example, the recording size (file format) of shot images, the frame speed in continuous shooting, and the number of continuously-shot images. In addition, during shooting of still images, the temperature inside the housing of the camera body 130 of the digital camera 100 barely increases.

Next, internal configurations of the digital camera 100 and the lens unit 200 according to the present embodiment will be described with reference to FIG. 2. In FIG. 2, constituents that are the same as those in FIG. 1 are given the same reference signs thereas.

The lens unit 200 includes a diaphragm 201 and a shooting lens 202, and is attachable to and detachable from the digital camera 100. Although the shooting lens 202 is normally comprised of a plurality of lenses, it is illustrated here as only one lens for the sake of simplicity.

A communication terminal 203 is an electrical contact point that is intended for the lens unit 200 to communicate with the digital camera 100. The communication terminal 203 of the lens unit 200 is electrically connected to the communication terminal 110 of the digital camera 100 in a state where the lens unit 200 is attached to the camera body 130 of the digital camera 100. The control unit 101 of the digital camera 100 controls the diaphragm 201 and the shooting lens 202 by communicating with the lens unit 200 via the communication terminals 110 and 203.

The control unit 101 realizes each type of processing of a later-described flowchart by executing a program stored in a nonvolatile memory 116. A working memory 117 is a RAM or the like; for example, constants and variables for the operations of the control unit 101 and the program read out from the nonvolatile memory 116 are loaded thereto.

A focal-plane shutter 109 is capable of freely controlling an exposure time period of the image capturing unit 102 in accordance with an instruction from the control unit 101.

The nonvolatile memory 116 is, for example, an electrically erasable and recordable EEPROM or the like. Constants for the operations of the control unit 101, the program, and the like are stored in the nonvolatile memory 116. The program according to the present embodiment refers to a program for executing the flowchart that is described later using FIG. 4.

Also, the control unit 101 executes predetermined pixel interpolation, resize processing such as reduction, and color conversion processing with respect to image data captured by the image capturing unit 102. Furthermore, the control unit 101 executes computational processing using image data captured by the image capturing unit 102, and performs automatic exposure (AE) control and autofocus (AF) control based on the result of the computation.

In the still image shooting mode, the control unit 101 starts the AE control and the AF control when the still image shooting button 103 has been pressed halfway, and executes still image shooting processing, which is recording of image data captured by the image capturing unit 102 into the recording medium 150, when the still image shooting button 103 has been fully pressed.

Furthermore, in the moving image shooting mode, the control unit 101 performs the AE control and the AF control with respect to image data (frames) captured by the image capturing unit 102 and continues moving image shooting processing, which is recording of moving images of a predetermined time period into the recording medium 150, in response to initial pressing of the moving image shooting button 106, and stops the moving image shooting processing when the moving image shooting button 106 is pressed again.

An operation unit 118 represents operation members, such as various types of switches and buttons, that accept various types of operations from the user and provide notifications to the control unit 101. The operation unit 118 includes at least the still image shooting button 103, the mode dial 104, the power switch 105, the moving image shooting button 106, and the touch panel 107a.

An image memory 119 stores image data captured by the image capturing unit 102 and data for image display, which is to be displayed on the display unit 107 or the eyepiece unit 108. The image memory 119 has a storage capacity that is sufficient to store a predetermined number of still images, and moving images and audio of a predetermined time period.

A power unit 120 is comprised of a primary battery such as an alkaline battery and a lithium battery, a secondary battery such as a NiCd battery, a NiMH battery, and a Li-ion battery, or the like. A recording medium I/F 121 is an interface with the recording medium 150, which is a memory card, a hard disk, or the like. The recording medium 150 is a recording medium, such as a memory card, for recording still images or moving images in the still image shooting processing or the moving image shooting processing, and is comprised of a semiconductor memory, a magnetic disk, or the like.

<Method of Calculating Estimated Ambient Temperature Tout>

Next, a method of calculating an estimated ambient temperature Tout based on the first ambient temperature T1 and the second ambient temperature T2 will be described with reference to FIG. 3.

Figure 3:
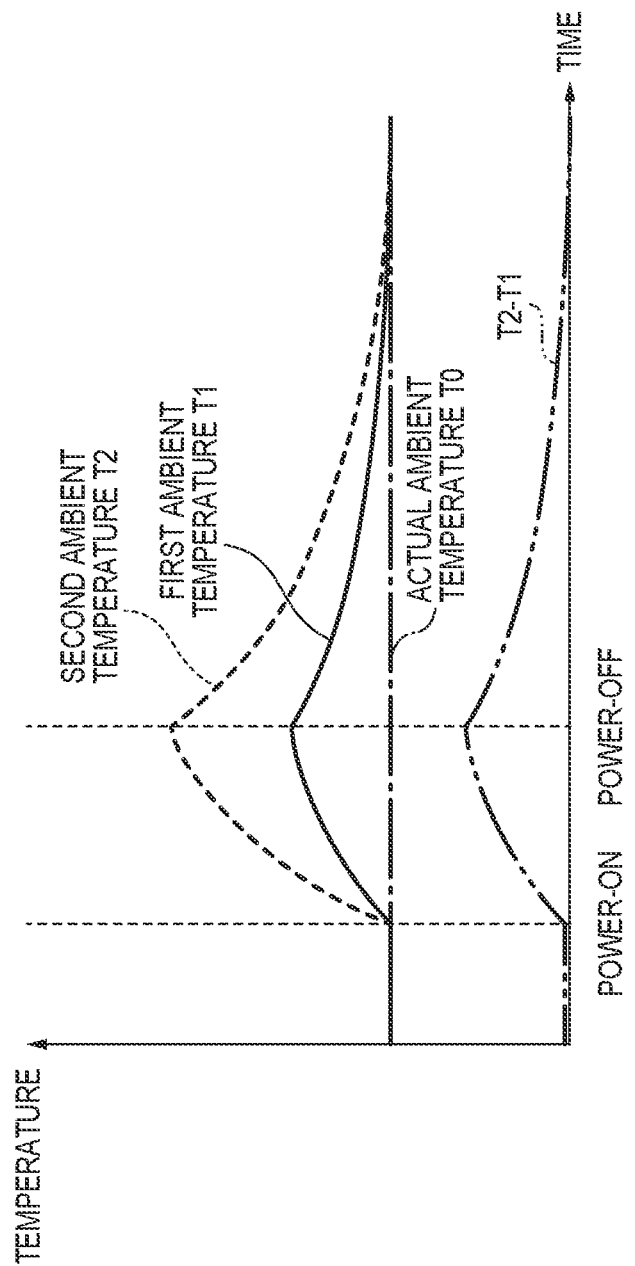
FIG. 3 is a diagram illustrating a method of calculating an estimated ambient temperature according to the present embodiment.

FIG. 3 is a diagram illustrating the method of calculating the estimated ambient temperature Tout from the first ambient temperature T1 and the second ambient temperature T2 according to the present embodiment.

FIG. 3 exemplarily shows changes in the statuses of an actual ambient temperature T0, the first ambient temperature T1 detected by the first thermometer 111, the second ambient temperature T2 detected by the second thermometer 112, and a difference between the first ambient temperature T1 and the second ambient temperature T2 (T1−T2).

It is assumed that the actual ambient temperature T0 (a dash-dot line) is constant until the power of the digital camera 100 is turned ON, and the first ambient temperature T1 (a solid line) and the second ambient temperature T2 (a dot line) are the same as the actual ambient temperature T0 until the power is turned ON.

Next, when the power of the digital camera 100 has been switched from OFF to ON, the digital camera 100 executes activation processing. As the control unit 101 and the image capturing unit 102, which are the heat source devices, start operating in the activation processing, the temperature inside the housing of the camera body 130 starts to rise in the digital camera 100.

The second thermometer 112 is arranged at a position that is closer to the control unit 101 and the image capturing unit 102, which are the heat source devices, than the first thermometer 111 is. Therefore, the gradient of temperature increase of the second ambient temperature T2 detected by the second thermometer 112 is greater than the gradient of temperature increase of the first ambient temperature T1 detected by the first thermometer 111. Therefore, the second ambient temperature T2 is higher than the first ambient temperature T1 when the power is turned OFF.

Next, when the power of the digital camera 100 has been switched from ON to OFF, the digital camera 100 executes shutdown processing. In the shutdown processing, the control unit 101 and the image capturing unit 102, which are the heat source devices, stop operating, and the temperature inside the housing of the camera body 130 starts to decrease in the digital camera 100. In this case, the differences between the first ambient temperature T1 and the actual ambient temperature and the difference between the second ambient temperature T2 and the actual ambient temperature T0 decrease with the elapse of time since the power-OFF.

In FIG. 3, the change in the status of the difference between the first ambient temperature T1 and the second ambient temperature T2 (T2−T1) is indicated by a dash-dot-dot line. In the present embodiment, the first thermometer 111 and the second thermometer 112 are arranged inside the housing of the camera body 130 of the digital camera 100 so that "the second ambient temperature T2—the first ambient temperature T1" and "the first ambient temperature T1—the actual ambient temperature T0" are in a proportional relationship after the power-OFF.

The estimated ambient temperature Tout after the power-OFF is calculated using the following expression 1.

Estimated ambient temperature $Tout$=first ambient temperature $T1$−α·(second ambient temperature $T2$−first ambient temperature $T1$) (Expression 1)

In the above expression 1, α is a coefficient, and is determined by, for example, actually measuring the changes in the first ambient temperature T1 and the second ambient temperature T2 after the power-OFF. In the present embodiment, α is set at 1.

As described above, the estimated ambient temperature Tout can be calculated using the first ambient temperature T1 and the second ambient temperature T2.

<Control Processing>

Figure 4:
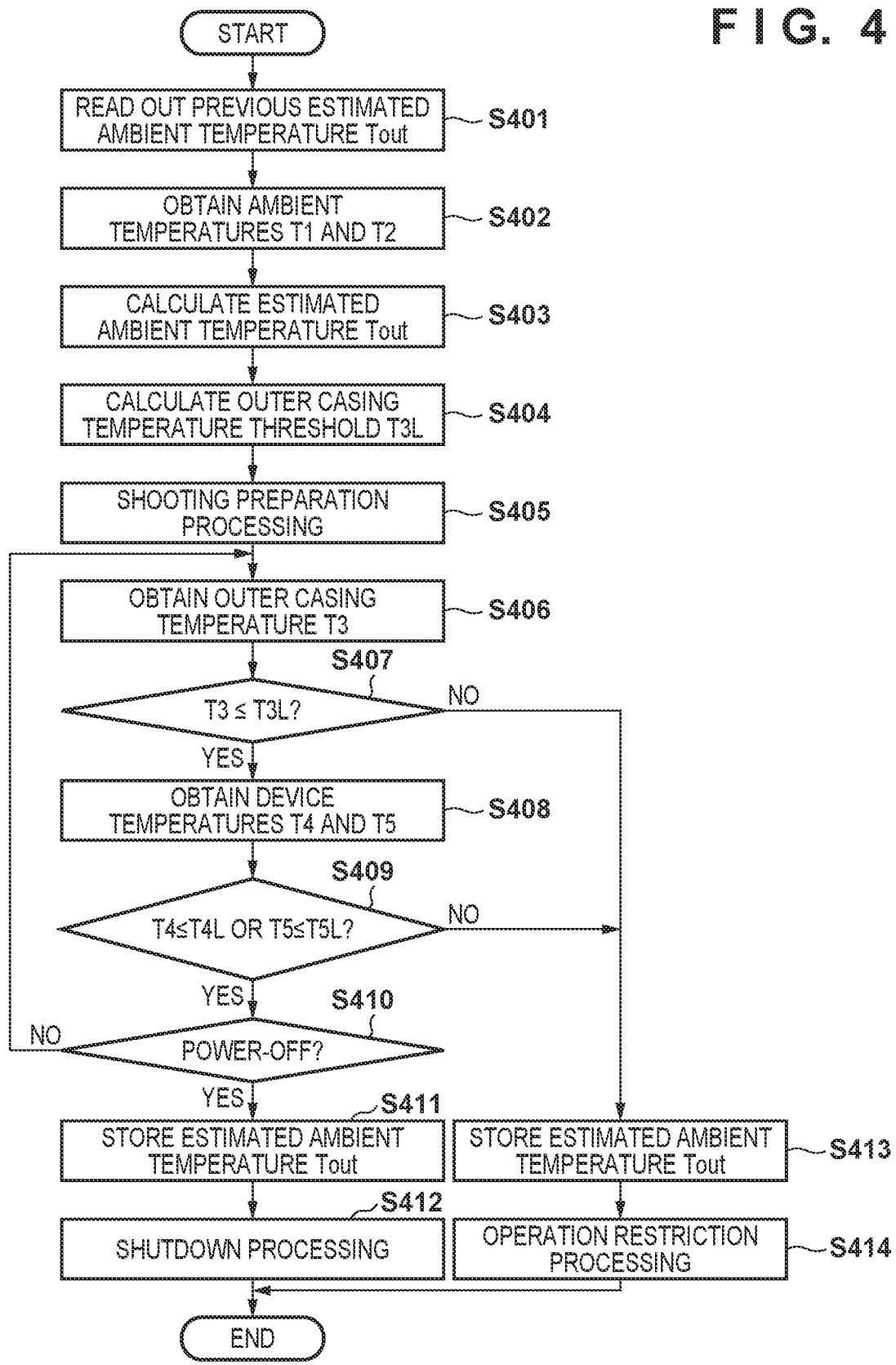
FIG. 4 is a flowchart showing processing for controlling operations of the electronic apparatus according to the present embodiment.

Next, with reference to FIG. 4, a description is given of processing for controlling the operations of the digital camera 100 based on the estimated ambient temperature Tout, the outer casing temperature T3, and the device temperatures T4 and T5 according to the present embodiment.

FIG. 4 is a flowchart showing the processing for controlling the operations of the digital camera 100 based on the estimated ambient temperature Tout, the outer casing temperature T3, and the device temperatures T4 and T5 according to the present embodiment.

The processing of FIG. 4 is realized when the power of the digital camera 100 has been turned ON and the control unit 101 has loaded the program stored in the nonvolatile memory 116 to the working memory 117 and executed the program to control each component.

In step S401, the control unit 101 reads out, from the nonvolatile memory 116, the estimated ambient temperature Tout that was stored at the end of previous processing. In a case where the nonvolatile memory 116 does not store the estimated ambient temperature Tout at the end of previous processing, the control unit 101 reads out an initial value of the estimated ambient temperature Tout from the nonvolatile memory 116. The initial value is set at 23° C., for example.

In step S402, the control unit 101 obtains the first ambient temperature T1 from the first thermometer 111, and obtains the second ambient temperature T2 from the second thermometer 112. Then, the control unit 101 stores the first ambient temperature T1 obtained from the first thermometer 111 and the second ambient temperature T2 obtained from the second thermometer 112 into the working memory 117.

In step S403, the control unit 101 calculates the estimated ambient temperature Tout based on the first ambient temperature T1 and the second ambient temperature T2 obtained in step S402, and stores the same into the working memory 117. The control unit 101 calculates the estimated ambient temperature Tout by assigning the first ambient temperature T1 and the second ambient temperature T2 obtained in step S402 to the above-described expression 1.

In step S404, the control unit 101 calculates an outer casing temperature threshold T3L for the digital camera 100 from the following expression 2, and stores the same into the working memory 117. The control unit 101 calculates the outer casing temperature threshold T3L by adding a constant H to the estimated ambient temperature Tout calculated in step S403.

Outer casing temperature threshold $T3L$=estimated ambient temperature $Tout$+$H$ (Expression 2)

In the above expression 2, the constant H is a fixed value (e.g., 20° C.).

In step S405, the control unit 101 executes shooting preparation processing of the digital camera 100. The control unit 101 starts driving of the image capturing unit 102, and displays image data captured by the image capturing unit 102 as a live view on the display unit 107. As a result, the image capturing unit 102 is activated, and a processing load of the control unit 101 increases; therefore, power consumed by the digital camera 100 and the amounts of heat generation therein increase as well. Upon completion of the shooting preparation processing, shooting of still images or shooting of moving images can be performed; in subsequent steps S406 to S410, the still image shooting processing corresponding to a user operation on the still image shooting button 103, or the moving image shooting processing corresponding to a user operation on the moving image shooting button 106, is executed in parallel. In this case, the operation modes of the digital camera 100 include not only the still image shooting mode and the moving image shooting mode, but also a moving image shooting mode for shooting moving images temporarily during the still image shooting mode, a 4K moving image shooting mode or an 8K moving image shooting mode included in the moving image shooting mode, or the like.

In step S406, the control unit 101 stores the outer casing temperature T3 obtained from the third thermometer 113 into the working memory 117.

In step S407, the control unit 101 compares the outer casing temperature threshold T3L set in step S404 with the outer casing temperature T3 obtained in step S406. The control unit 101 causes the processing to proceed to step S408 in a case where it has determined that the outer casing temperature T3 is equal to or lower than the outer casing temperature threshold T3L, and causes the processing to proceed to step S413 in a case where it has determined that the outer casing temperature T3 is not equal to or lower than the outer casing temperature threshold T3L.

In step S408, the control unit 101 stores the fourth device temperature T4 obtained from the fourth thermometer 114 and the fifth device temperature T5 obtained from the fifth thermometer 115 into the working memory 117.

In step S409, the control unit 101 compares the fourth device temperature T4 obtained in step S408 with a fourth device temperature threshold T4L. The fourth device temperature threshold T4L is an upper limit temperature for guaranteeing the operations of the control unit 101, which is a heat source device. The fourth device temperature threshold T4L is a fixed value, and is set at 70° C., for example. The control unit 101 causes the processing to proceed to step S410 in a case where it has determined that the fourth device temperature T4 is equal to or lower than the fourth device temperature threshold T4L, and causes the processing to proceed to step S413 in a case where it has determined that the fourth device temperature T4 is higher than the fourth device temperature threshold T4L.

Also, the control unit 101 compares the fifth device temperature T5 obtained in step S408 with a fifth device temperature threshold T5L. The fifth device temperature threshold T5L is an upper limit temperature for guaranteeing the operations of the image capturing unit 102, which is a heat source device. The fifth device temperature threshold T5L is a fixed value, and is set at 80° C., for example. The control unit 101 causes the processing to proceed to step S410 in a case where it has determined that the fifth device temperature T5 is equal to or lower than the fifth device temperature threshold T5L, and causes the processing to proceed to step S413 in a case where it has determined that the fifth device temperature T5 is not equal to or lower than the fifth device temperature threshold T5L.

Note that although the control unit 101 and the image capturing unit 102 are exemplarily described as the heat source devices for which the determination of step S409 is made in the present embodiment, no limitation is intended by this. In a case where there is a heat source device other than the control unit 101 and the image capturing unit 102, a comparison with a device temperature threshold may be similarly made also with respect to another heat source device.

In step S410, the control unit 101 determines whether the power switch 105 has been switched from ON to OFF. In a case where the control unit 101 has determined that the power switch 105 has been switched from ON to OFF, it causes the processing to proceed to step S411. In a case where the control unit 101 has determined that the power switch 105 has not been switched from ON to OFF, it causes the processing to return to step S406, and continues the processing in accordance with the operation mode of the digital camera 100.

In step S411, the control unit 101 stores the estimated ambient temperature Tout calculated in step S403 into the nonvolatile memory 116.

In step S412, the control unit 101 executes the shutdown processing. Here, for example, the control unit 101 stops a power supply to the image capturing unit 102 and the display unit 107.

In step S413, the control unit 101 stores the estimated ambient temperature Tout calculated in step S403 into the nonvolatile memory 116.

In step S414, the control unit 101 executes processing for restricting the operations of the digital camera 100. Here, for example, the control unit 101 displays, on the display unit 107, information for providing the user with a notification indicating that a shutdown is to be performed as a result of the outer casing temperature T3 reaching the outer casing temperature threshold T3L or the device temperature T4 or T5 reaching the device temperature threshold T4L or T5L; then, after a predetermined time period has elapsed since the display, shutdown processing similar to that of step S412 is executed.

<Processing for Notification until Reaching Operation Restriction Temperature of Digital Camera 100>

On the digital camera 100, an operation restriction indicator for notifying the user of an operation state of the digital camera 100 related to an operation restriction temperature is displayed on the display unit 107. Processing for displaying the operation restriction indicator will be described with reference to FIGS. 5A to 5C and 6. Based on the outer casing temperature and the heat source device temperatures of the digital camera 100 (hereinafter, a camera temperature), the number of segments of a temperature increase level until the temperature of the digital camera 100 reaches the operation restriction temperature is increased or reduced. In this way, the user is notified of an operation state of the digital camera 100 related to the operation restriction temperature.

Figure 5A:
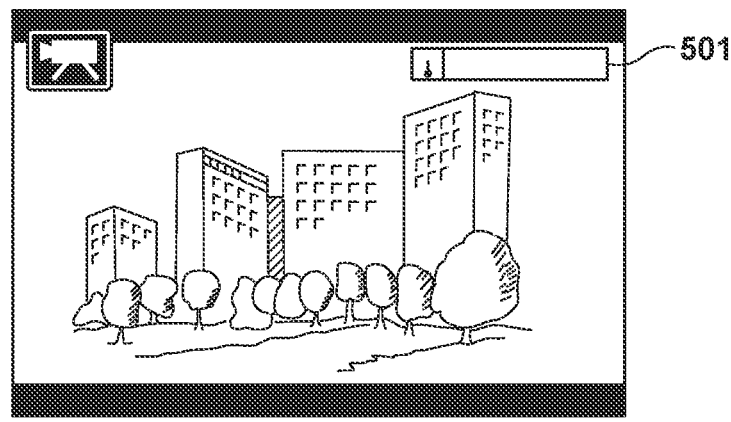
FIGS. 5A to 5C are diagrams illustrating display screens in display control processing for an operation restriction indicator according to a first embodiment.
Figure 5B:
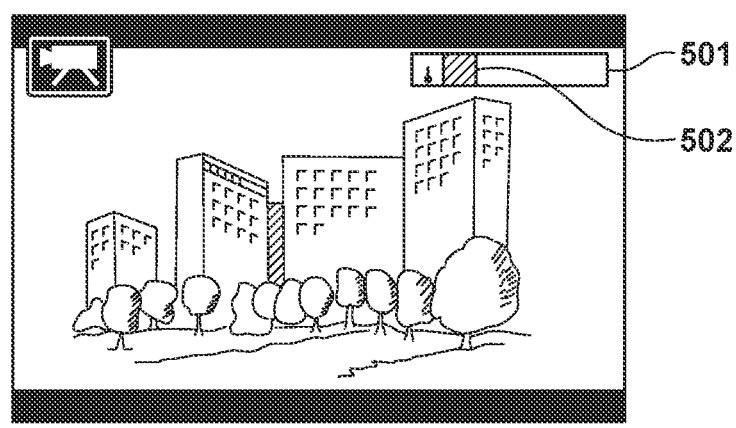
Figure 5C:
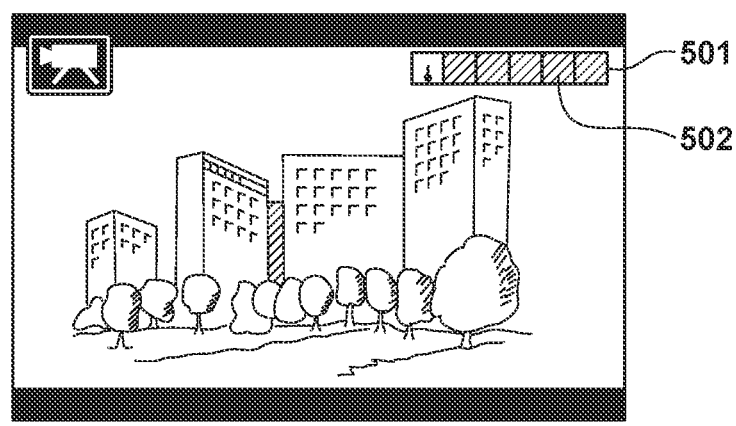

FIGS. 5A to 5C exemplarily show display states of an operation restriction indicator 501 displayed on the display unit 107 of the digital camera 100 according to the present embodiment. The operation restriction indicator 501 provides a notification indicating a level until the temperature of the digital camera 100 reaches the operation restriction temperature. In the embodiment, the number of segments of a temperature increase level 502 is increased or reduced to notify the user of the operable time period of the digital camera 100. Here, the temperature of the digital camera 100 refers to the outer casing temperature of the digital camera 100 and the temperatures of the heat source devices. Furthermore, the operation restriction temperature refers to the temperature of the outer casing temperature threshold and the temperatures of the device temperature thresholds. Specifically, the operation restriction indicator 501 notifies the user of the shootable time period until the operations of the digital camera 100 are restricted when the outer casing temperature T3 of the digital camera 100 has reached the outer casing temperature threshold T3L, or the heat source device temperature T4 or T5 has reached the device temperature threshold T4L or T5L.

FIG. 5A exemplarily shows a state where the operation restriction indicator 501 is displayed in a predetermined region of the display unit 107 (display state 0). As a result of displaying the operation restriction indicator 501, the user is notified of the camera temperature approaching the operation restriction temperature.

FIG. 5B exemplarily shows a state where the operation restriction indicator 501 displays one segment as the temperature increase level 502 as a result of the first update of the operation restriction indicator 501 (display state 1). As opposed to the display state 0, the temperature increase level 502 indicating a level until the camera temperature reaches the operation restriction temperature; consequently, the user can be notified of the camera temperature approaching the operation restriction temperature more than the case of the display state 0.

FIG. 5C shows a state where the number of segments of the temperature increase level 502 of the operation restriction indicator 501 has increased to N as a result of the $N^{th}$ update of the operation restriction indicator 501 (display state N). FIG. 5C shows, for example, a display state when N is 5. As a result of filling the entire temperature increase level 502 of the operation restriction indicator 501 with segments as shown in FIG. 5C, the user can be notified of the fact that the operations of the digital camera 100 are to be restricted (shut down) at the next update timing.

As shown in FIGS. 5A to 5C, the level until the camera temperature reaches the operation restriction temperature is displayed by increasing or reducing the number of segments of the temperature increase level 502 of the operation restriction indicator 501; in this way, the user can be notified of the shootable time period until the operations of the digital camera 100 are restricted. That is to say, misunderstanding of the user related to the shootable time period until the camera temperature reaches the operation restriction temperature can be alleviated by enhancing consistency between the display start timing or the update timing of the operation restriction indicator 501 and the temperature increase level 502 and the shootable time period of the digital camera 100.

Next, display control processing for the operation restriction indicator 501 according to the present embodiment will be described with reference to FIG. 6.

Figure 6:
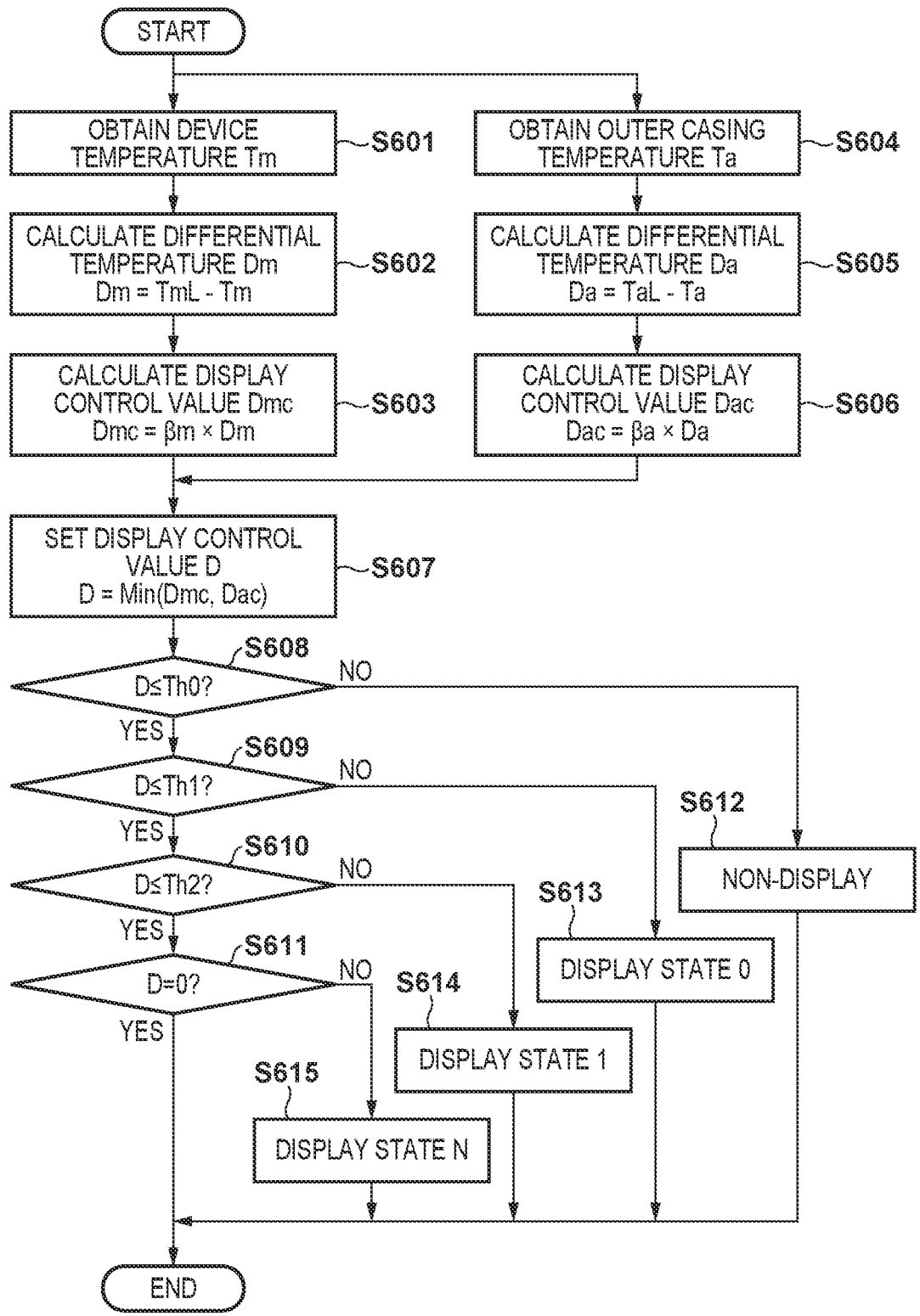
FIG. 6 is a flowchart showing the display control processing for the operation restriction indicator 501 according to the first embodiment.

FIG. 6 is a flowchart showing the display control processing for the operation restriction indicator 501 according to the present embodiment.

The processing of FIG. 6 is realized by the control unit 101 loading the program stored in the nonvolatile memory 116 to the working memory 117, executing the program, and controlling each component. Also, the processing of FIG. 6 is executed in parallel with the processing of FIG. 4. The same goes for FIG. 9, which will be described later.

The following describes an example of display control processing during shooting of moving images based on the outer casing temperature T3 and on the device temperature T5 of the image capturing unit 102, which is expected to generate a larger amount of heat than the control unit 101 in the moving image shooting mode, among the control unit 101 and the image capturing unit 102 that act as the heat source devices. Note that similar display control processing may be executed based on the device temperature T4 of the control unit 101, and similar display control processing may be executed based on the device temperature T4 of the control unit 101 and on the device temperature T5 of the image capturing unit 102.

Note that in the following description, an index m is appended to a parameter related to a device temperature, whereas an index a is appended to a parameter related to an outer casing temperature.

In step S601, the control unit 101 obtains, from the fifth thermometer 115, the device temperature Tm at the current time t during shooting of moving images.

In step S602, the control unit 101 obtains a differential temperature Dm indicating a difference between a device temperature threshold TmL for the device temperature Tm and the device temperature Tm obtained in step S601. The device temperature threshold TmL has been set in advance and stored in the nonvolatile memory 116.

In step S603, the control unit 101 calculates a first display control value Dmc by multiplying the differential temperature Dm obtained in step S602 by a correction value $\beta m$. The first display control value Dmc is a parameter for determining the display start timing and the update timing of the operation restriction indicator 501 and the temperature increase level 502. The correction value $\beta m$ is a coefficient for correcting the display start timing of the operation restriction indicator 501 and the temperature increase level 502, and is used to correct variations in the display start timing of the operation restriction indicator 501, which will be described later. Furthermore, the correction value $\beta m$ is a value that is set in accordance with the temperature increase characteristics of the heat source devices during shooting of moving images. The details of the correction value $\beta m$ will be described later.

In step S604, the control unit 101 obtains, from the third thermometer 113, the outer casing temperature Ta at the current time t during shooting of moving images.

In step S605, the control unit 101 obtains a differential temperature Da indicating a difference between an outer casing temperature threshold TaL for the outer casing temperature Ta and the outer casing temperature Ta. The outer casing temperature threshold TaL has been set in advance and stored in the nonvolatile memory 116.

In step S606, the control unit 101 calculates a second display control value Dac by multiplying the differential temperature Da obtained in step S605 by a correction value $\beta a$. Similarly to the first display control value Dmc, the second display control value Dac is a parameter for determining the display start timing and the update timing of the operation restriction indicator 501 and the temperature increase level 502. Similarly to the correction value $\beta m$, the correction value $\beta a$ is a coefficient for correcting the display start timing of the operation restriction indicator 501 and the temperature increase level 502, and is used to correct variations in the display start timing of the operation restriction indicator 501, which will be described later.

In step S607, the control unit 101 compares the first display control value Dmc calculated in step S603 with the second display control value Dac calculated in step S606, and sets the smaller one of them as a display control value D that is a target of processing.

In step S608, the control unit 101 determines whether the display control value D set in step S607 is equal to or smaller than a display control threshold Th0. The control unit 101 causes processing to proceed to step S609 in a case where it has determined that the display control value D is equal to or smaller than the display control threshold Th0, and causes processing to proceed to step S612 in a case where it has determined that the display control value D is larger than the display control threshold Th0.

In step S609, the control unit 101 determines whether the display control value D set in step S607 is equal to or smaller than a display control threshold Th1. The control unit 101 causes processing to proceed to step S610 in a case where it has determined that the display control value D is equal to or smaller than the display control threshold Th1, and causes processing to proceed to step S613 in a case where it has determined that the display control value D is larger than the display control threshold Th1.

The control unit 101 determines whether the display control value D set in step S607 is equal to or smaller than a display control threshold Th2. The control unit 101 causes processing to proceed to step S611 in a case where it has determined that the display control value D is equal to or smaller than the display control threshold Th2, and causes processing to proceed to step S614 in a case where it has determined that the display control value D is larger than the display control threshold Th2.

After executing processing similar to steps S608 to S610 repeatedly with respect to display control thresholds Th3 to ThN, the control unit 101 causes processing to proceed to step S611. N in the display control threshold ThN is a value corresponding to the largest number of segments displayed in the temperature increase level 502, and the nonvolatile memory 116 stores N+1 display control thresholds Th, including Th0.

The display control thresholds Th0 to ThN (where N is an arbitrary natural number) are stored in advance in the nonvolatile memory 116, and read out by the control unit

101. The display control thresholds Th0 to ThN are parameters for determining the display start timing and the update timing of the operation restriction indicator 501 and the temperature increase level 502. The operation restriction indicator 501 and the temperature increase level 502 are displayed and updated when the display control value D has become the same value as the display control threshold ThN. The details of the display control thresholds Th0 to ThN will be described later.

In step S611, the control unit 101 determines whether the display control value D is equal to 0. In a case where the control unit 101 has determined that the display control value D is equal to 0, it causes processing to proceed to step S412 of FIG. 4, and operation restriction processing is executed. In a case where the control unit 101 has determined that the display control value D is larger than 0, it causes processing to proceed to step S615.

Steps S612 to S615 are processing in which the display state of the operation restriction indicator 501 is set, and the user is notified of the level until the heat source devices reach the operation restriction temperature based on the state of heat generation in the digital camera 100.

In step S612, the control unit 101 does not display the operation restriction indicator 501 on the display unit 107.

In step S613, the control unit 101 starts displaying the operation restriction indicator 501 on the display unit 107 (display state 0). As shown in FIG. 5A, the display state 0 is a display state where the operation restriction indicator 501 does not display segments of the temperature increase level 502.

In step S614, the control unit 101 performs the first update of the operation restriction indicator 501 displayed on the display unit 107 (display state 1). As shown in FIG. 5B, the display state 1 is a display state where the operation restriction indicator 501 displays one segment of the temperature increase level 502.

In step S615, the control unit 101 performs the $N^{th}$ update of the operation restriction indicator 501 displayed on the display unit 107 (display state N). FIG. 5C exemplarily shows a display state where the operation restriction indicator 501 displays N segments of the temperature increase level 502 (N=5).

As described above, according to the present embodiment, the display start timing of the operation restriction indicator 501 is controlled using values obtained by correcting the difference between a device temperature or an outer casing temperature and a temperature threshold in accordance with the temperature increase characteristics of each temperature. In this way, the user is notified of the level until the camera temperature reaches the operation restriction temperature.

In the present embodiment, a plurality of types of temperatures, such as the device temperatures and the outer casing temperature, exist as the temperatures that are determination targets of the operation restriction temperature. Therefore, in a case where there is a large difference in the temperature increase characteristics (a gradient of temperature increase) between the temperatures that are the determination targets during shooting of moving images, there is a possibility that the display start timing of the operation restriction indicator 501 varies, thereby misleading the user.

Figure 7A:
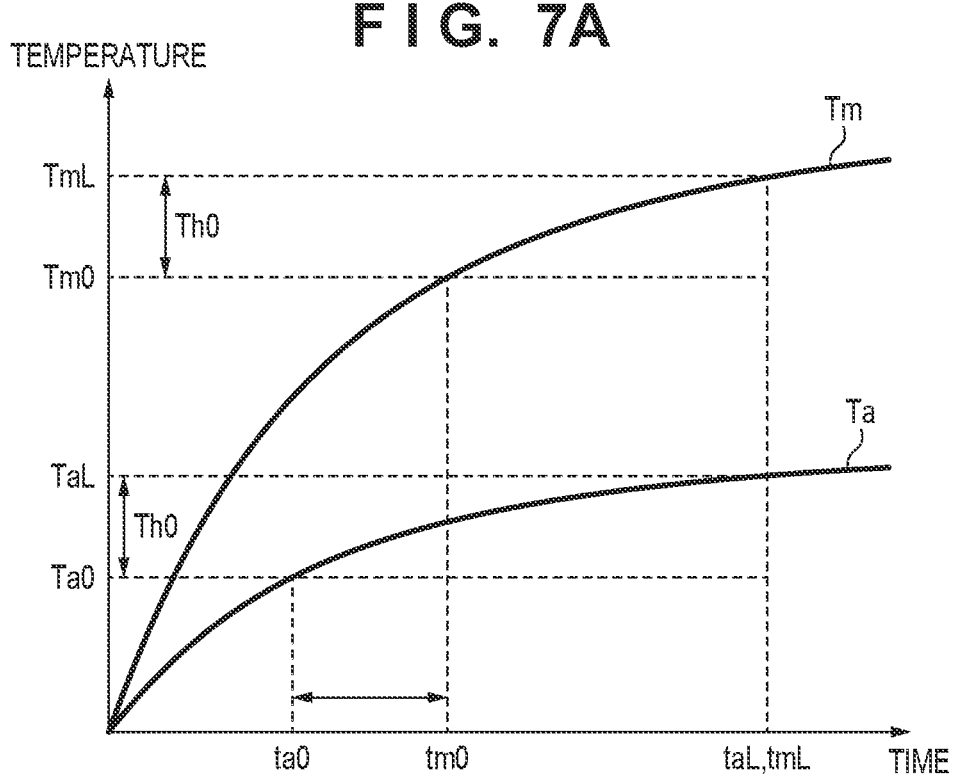
FIGS. 7A and 7B are diagrams illustrating variations in a display start timing of the operation restriction indicator according to the first embodiment.

FIG. 7A exemplarily shows changes in the statuses of the device temperature Tm and the outer casing temperature Ta after shooting of moving images has been started; a horizontal axis represents time in shooting of moving images, and a vertical axis represents a temperature.

As shown in FIG. 7A, the device temperature Tm is the temperature of the image capturing unit 102 that acts as a heat source device, and thus the gradient of temperature increase thereof is steep. On the other hand, the outer casing temperature Ta is the temperature at the position distanced from the heat source devices, and thus the gradient of temperature increase thereof is more gradual than that of the device temperature Tm.

In FIG. 7A, time tmL indicates a moving image shooting period until the device temperature Tm reaches the device temperature threshold TmL, and time taL indicates a moving image shooting period until the outer casing temperature Ta reaches the outer casing temperature threshold TaL. In the examples of FIG. 7A, time tmL and time taL have the same value for ease of explanation; however, they may have different values. Furthermore, provided that the device temperature at time tm0 is Tm0, time tm0 represents time at which the difference between the device temperature threshold TmL and the device temperature Tm0 becomes equal to the display control threshold Th0. As has been described in relation to steps S608, S609, and S613 of FIG. 6, when the display control value D has become equal to or smaller than the display control threshold Th0, display of the operation restriction indicator 501 is started. Therefore, time tm0 corresponds to time at which display of the operation restriction indicator 501 is started in accordance with an increase in the device temperature Tm. Similarly, time ta0 corresponds to time at which display of the operation restriction indicator 501 is started in accordance with an increase in the outer casing temperature Ta.

As shown in FIG. 7A, despite the fact that tmL, which indicates the moving image shooting period until the device temperature Tm reaches the device temperature threshold TmL, and taL, which indicates a moving image shooting period until the outer casing temperature Ta reaches the outer casing temperature threshold TaL, are the same shootable time period, the time to start display of the operation restriction indicator 501 varies (tm0 and ta0) due to the difference in the gradient of temperature increase between the temperatures. In this way, in a case where there are a plurality of types of temperatures that are determination targets of the operation restriction temperature depending on the environment in which the digital camera 100 is used, the timing to start display of the operation restriction indicator 501 varies depending on the environment in which the digital camera 100 is used. For example, provided that the shootable time period is 100%, the following situation arises: for the device temperature Tm, display of the operation restriction indicator 501 is started at a timing corresponding to 50% of the shootable time period, whereas for the outer casing temperature Ta, display of the operation restriction indicator 501 is started at a timing corresponding to 25% of the shootable time period. This gives rise to the possibility of misleading the user; for example, the user may misjudge a time period until the operation restriction temperature is reached. In view of the foregoing background, the present embodiment aims to alleviate misunderstanding of the user attributed to the display start timing of the operation restriction indicator 501 by using the correction values β in steps S603 and S606 of FIG. 6.

Next, the actions and advantageous effects of the use of the correction values β will be described with reference to FIG. 7B.

As has been described in relation to steps S603 and S606 of FIG. 6, the correction values β are coefficients for correcting the display start timing of the operation restriction indicator 501, and are used to correct variations in the display start timing of the operation restriction indicator 501. FIG. 7B exemplarily shows temporal changes in the differential temperature Da between the outer casing temperature threshold TaL and the outer casing temperature Ta, and in the second display control value Dac obtained by multiplying the differential temperature Da by the correction value βa; a horizontal axis represents time in shooting of moving images, and a vertical axis represents a temperature. In the examples of FIG. 7B, only the outer casing temperature Ta is shown, and the differential temperature and the second display control value at arbitrary time t1 after shooting has been started are Da1 and Dac1, respectively.

Figure 7B:
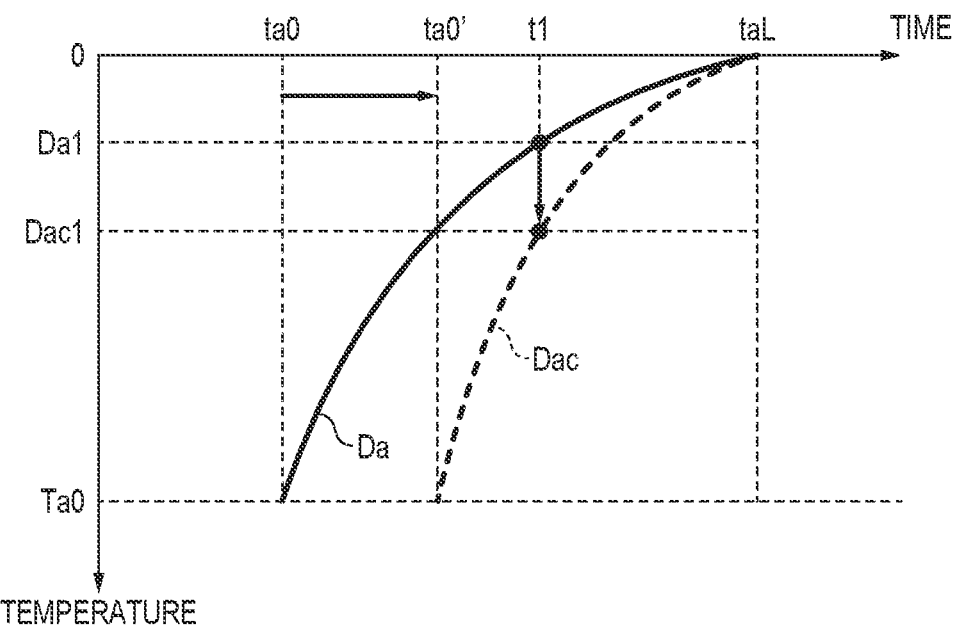

As shown in FIG. 7B, multiplying the differential temperature Da1 at arbitrary time t1 by the correction value βa yields the second display control value Dac1 (=βa×Da1), which is the differential temperature after correction. Similarly, a curved line obtained by multiplying the differential temperature Da by the correction value βa is the second display control value Dac. FIG. 7B exemplarily shows the second display control value Dac under the setting βa>1; the second display control value Dac is corrected so that it has a larger value than the differential temperature Da. In this way, the timing at which the second display control value Dac reaches the display control threshold Th0 is later than the timing at which the differential temperature Da reaches the display control threshold Th0. This means that the display start timing of the operation restriction indicator 501 is delayed. Consequently, the display start time ta0 of the operation restriction indicator 501 can be delayed to ta0' as shown in FIG. 7B.

As described above, the display start timing of the operation restriction indicator 501 can be controlled by applying the correction value βa to the differential temperature Da; therefore, the display start timing of the operation restriction indicator 501 can be set at an appropriate timing.

Next, a method of setting the correction values β will be described.

The correction values β are determined in accordance with the differential temperatures D, the display control threshold Th0, and target values of the display start times t0 of the operation restriction indicator 501 (ta0 and tm0). The following describes a method of calculating the correction value βa using the differential temperature Da related to the outer casing temperature Ta.

Assume that the differential temperature Da at arbitrary time t after shooting of moving images has been started is Da=f1(t). Provided that the display control threshold for determining the display start timing of the operation restriction indicator 501 is Th0 and the display start time of the operation restriction indicator 501 is ta0, the following expression 3 is obtained.

$$Th0 = f1(ta0) \quad \text{(Expression 3)}$$

Provided that the display start time of the operation restriction indicator 501 after correction is ta0', the following expression 4 is obtained.

$$Th0 = \beta a \times f1(ta0') \quad \text{(Expression 4)}$$

Provided that the ratio of the display start time ta0' to the shootable time period taL (a target value) is k [%], the correction value βa can be denoted by the following expression 5.

$$\beta a = Th0/f1(ta0') = Th0/f1(k/100 \times taL) \quad \text{(Expression 5)}$$

For example, provided that the target value k is 50%, the correction value βa is as follows.

$$\beta a = Th0/f1(0.5 \times taL)$$

The correction value βm for the device temperature Tm can be calculated in a similar manner. Also, in a case where there are a plurality of other temperatures that are determination targets of the operation restriction temperature, variations in the display start timing of the operation restriction indicator 501 can be alleviated for each of the temperatures that are the determination targets by setting the target values k at the same value and determining the correction values β separately for each of the temperatures that are the determination targets.

Furthermore, there is a possibility that the differential temperature Da exhibits different tendencies depending on, for example, the form of the moving image shooting mode, such as a high frame rate and a low frame rate. In view of this, it is desirable that a correction value β that has been set for each of the temperatures in determination processing be set separately for each of the operation modes. In this way, variations in the display start timing of the operation restriction indicator 501 can be alleviated under various shooting conditions, including different forms of the moving image shooting mode.

As described above, as a result of correcting the differential temperatures D using the correction values J, variations in the display start timing of the operation restriction indicator 501 in a plurality of shooting modes can be alleviated. However, as the above-described correction does not take variations in the update timing of the operation restriction indicator 501 into account, it may still be insufficient in terms of alleviation of misunderstanding of the user.

Figure 8A:
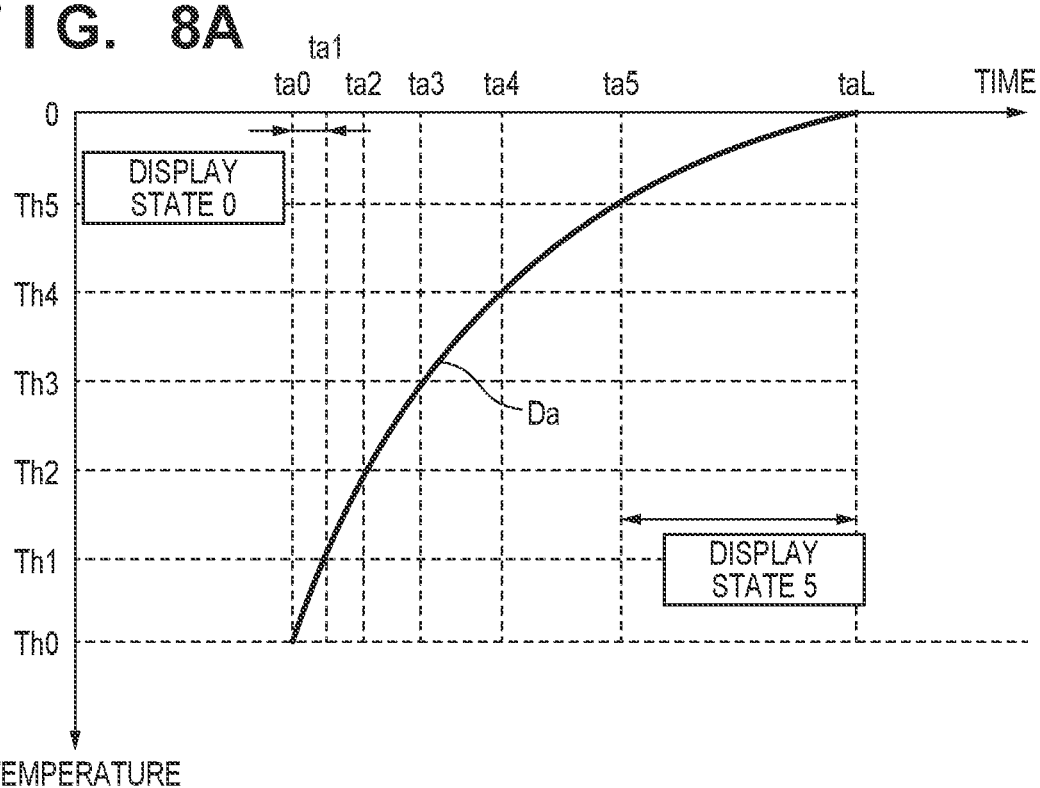
FIGS. 8A and 8B are diagrams illustrating variations in an update timing of the operation restriction indicator according to the first embodiment.
Figure 8B:
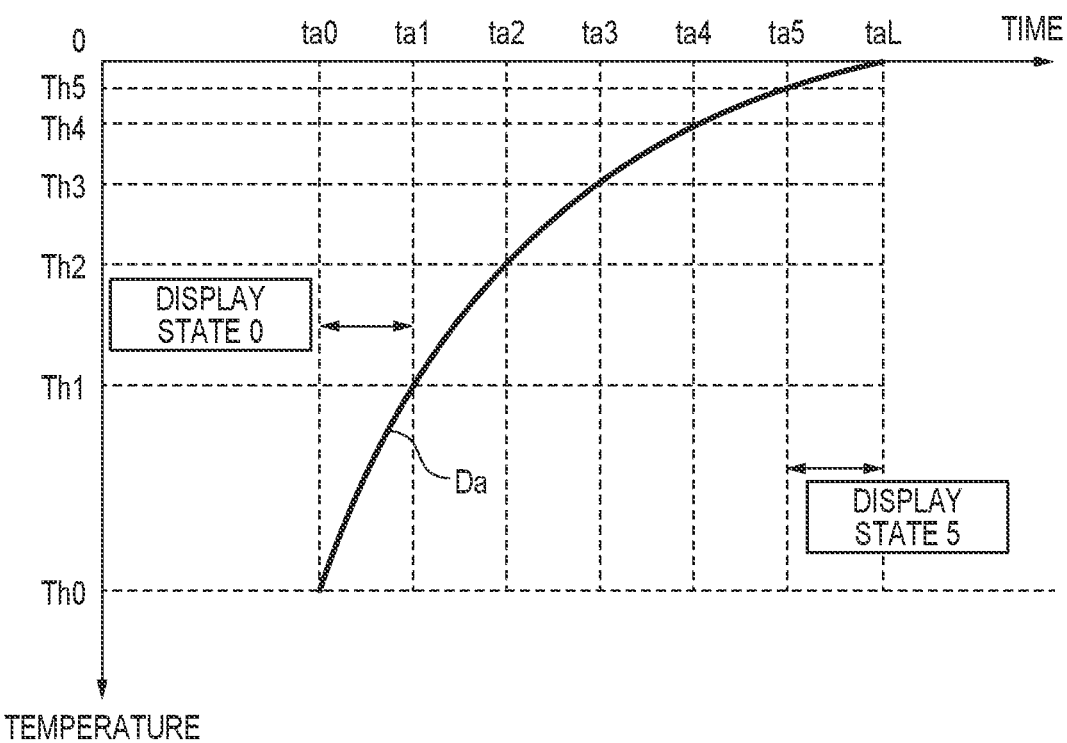

A description is now given of variations in the update timing of the operation restriction indicator 501 with reference to FIGS. 8A and 8B.

FIG. 8A exemplarily shows a differential temperature Da similar to that of FIG. 7B; a horizontal axis represents time in shooting of moving images, and a vertical axis represents a temperature.

As has been described using FIG. 6, the display control thresholds Th0 to Th5 are parameters for determining the display start timing and the update timing of the operation restriction indicator 501. FIG. 8A exemplarily shows a case where the operation restriction indicator 501 displays N segments of the temperature increase level 502 (N=5). Also, FIG. 8A exemplarily shows a case where the display control thresholds Th0 to Th5 have been set at an equal interval. In addition, assume that the times at which the differential temperature Da becomes equal to the display control thresholds Th0 to Th5 are ta0 to ta5, respectively. The display state 0 (FIG. 5A) is displayed in a time period of ta0≤t<ta1, whereas the display state 5 (FIG. 5C) is displayed in a time period of ta5≤t<taL.

As shown in FIG. 8A, there is a large difference between the time period in which the display state 0 is displayed and the time period in which the display state 5 is displayed, and the change occurs in a direction in which the time period until the next update increases with a progress in the display state (an increase in the number of segments of the temperature increase level 502). This gives rise to the possibility of misleading the user; for example, the user may have difficulty in predicting the shootable time period until the camera temperature reaches the operation restriction temperature, and stop shooting of moving images early.

Specifically, immediately after the user has started shooting of moving images, the temperature inside the housing of the digital camera 100 increases rapidly, and thus the frequency of update of the operation restriction indicator 501, that is to say, the speed of increase in the number of segments of the temperature increase level 502, is high. On the other hand, after a certain time period has elapsed since the start of shooting, the gradient of temperature increase becomes gradual, and thus the frequency of update of the operation restriction indicator 501, that is to say, the speed of increase in the number of segments of the temperature increase level 502, slows down. For example, immediately after the user has started shooting of moving images, the operation restriction indicator 501 is updated every two minutes; however, after the certain time period has elapsed, the operation restriction indicator 501 is updated every ten minutes. Therefore, the user may estimate a shorter shootable time period as the number of segments of the temperature increase level 502 of the operation restriction indicator 501 approaches the largest number (e.g., the display state 5 of FIG. 5C). This gives rise to the possibility of depriving the user of the opportunity of shooting; for example, the user may stop shooting of moving images earlier even though the user is in a state where shooting of moving images can be actually continued.

In view of this, in the present embodiment, the display control thresholds Th are set so that they satisfy the following conditional expression 6 as shown in FIG. 8B.

$$Th(n) - Th(n+1) < Th(n-1) - Th(n) \quad \text{(Expression 6)}$$

n is an arbitrary natural number, and 1≤n≤N (where N is the largest number of segments of the temperature increase level 502).

As shown in FIG. 8B, by setting the display control threshold ThN in such a manner that it increases progressively, the update timing of the operation restriction indicator 501 can be set at an equal interval, even with respect to the nonlinear differential temperature Da. This can enhance consistency between the frequency of update of the operation restriction indicator 501 and the shootable time period until the operation restriction temperature is reached, thereby enabling the user to predict the shootable time period with ease and preventing the user from being deprived of the opportunity of shooting.

Furthermore, regarding the differential temperature Da, the temperature increase characteristics exhibited by the camera temperature varies with each operation mode of the digital camera 100, such as moving image shooting modes at a high frame rate and a low frame rate, for example. In view of this, it is desirable to set the display control thresholds Th separately for each form of the moving image shooting mode. In this way, the update timing of the operation restriction indicator 501 can be set at an equal interval under various shooting conditions, including different forms of the moving image shooting mode. Consequently, consistency between the frequency of update of the operation restriction indicator 501 and the shootable time period can be enhanced, thereby enabling the user to accurately predict the remaining shootable time period and preventing the user from being deprived of the opportunity of shooting.

As described above, the first embodiment can notify the user of the level until the digital camera 100 reaches the operation restriction temperature by displaying the operation restriction indicator 501, while extending the shootable time period until the operation restriction temperature is reached to the maximum by improving the accuracy of estimation of the ambient temperature. Furthermore, by alleviating variations in the display start timing and the update timing of the operation restriction indicator 501, misunderstanding of the user related to the shootable time period until the operation restriction temperature is reached can be alleviated.

Second Embodiment

Next, the second embodiment according to the present invention will be described.

As opposed to the first embodiment in which the differential temperatures D are the correction targets, a second embodiment is an example in which the display control thresholds Th are the correction targets.

While the display control threshold Th0 is set at the same value (e.g., 10° C.) for both of the outer casing temperature Ta and the device temperature Tm in the first embodiment, the display control thresholds can be changed separately for each of the temperatures that are the determination targets in the second embodiment; for example, a display control threshold Tha0 for the outer casing temperature Ta is set at 5° C., and a display control threshold Thm0 for the device temperature Tm is set at 10° C. The display control threshold Th0 is a parameter for determining the display start timing of the operation restriction indicator 501. By setting the display control threshold Th0 for each of the temperatures that are the determination targets separately in accordance with the temperature increase characteristics of each of the temperatures that are the determination targets, the display start timing of the operation restriction indicator 501 can be controlled for each of the temperatures that are the determination targets. In this way, display of the operation restriction indicator 501 can be started at a desired timing, and thus the advantageous effects equivalent to those of the first embodiment can be achieved. Therefore, variations in the display start timing of the operation restriction indicator 501 among the temperatures that are the determination targets can be alleviated.

Next, display control processing for the operation restriction indicator 501 according to the second embodiment will be described with reference to FIG. 9.

Figure 9:
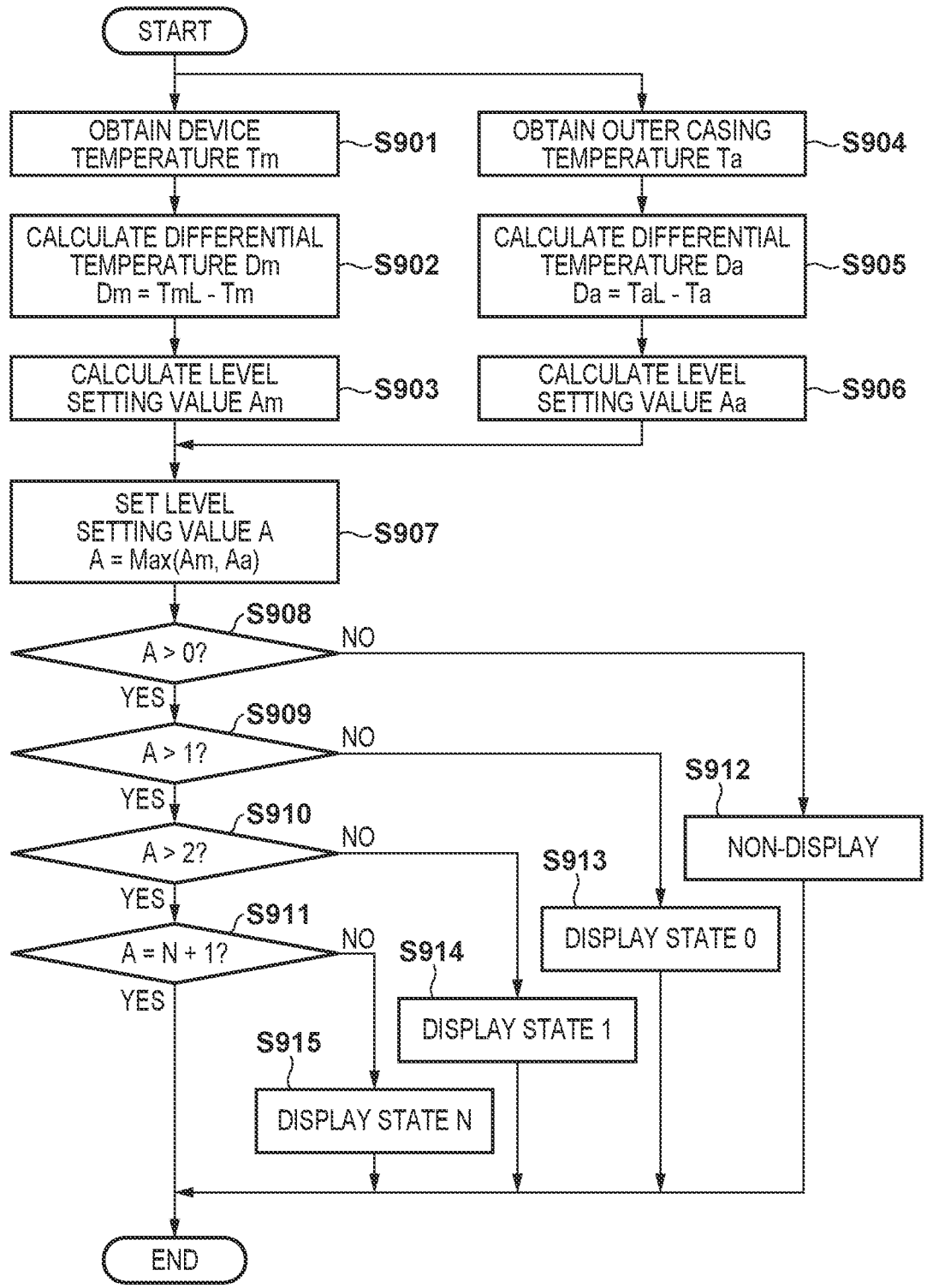
FIG. 9 is a flowchart showing display control processing of an operation restriction indicator according to a second embodiment.

FIG. 9 is a flowchart showing the display control processing for the operation restriction indicator 501 according to the second embodiment. Note that the apparatus configuration of the second embodiment is similar to that of the first embodiment.

In steps S901 and S904, the control unit 101 obtains, from the third thermometer 113 and the fifth thermometer 115, the device temperature Tm and the outer casing temperature Ta at the current time t during shooting of moving images.

In steps S902 and S905, the control unit 101 calculates the differential temperature Dm between the temperature threshold TmL for the device temperature Tm and the current device temperature Tm, and the differential temperature Da between the threshold temperature TaL for the outer casing temperature Ta and the current outer casing temperature Ta.

In steps S903 and S906, the control unit 101 calculates a first level setting value Am from the differential temperature Dm related to the device temperature Tm calculated in step S902, and calculates a second level setting value Aa from the differential temperature Da related to the outer casing temperature Ta calculated in step S905. The first level setting value Am and the second level setting value Aa are parameters for determining the display start timing of the operation restriction indicator 501 and the number of segments of the temperature increase level 502 displayed. A calculation method for the first level setting value Am and the second level setting value Aa will be described later.

In step S907, the control unit 101 compares the first level setting value Am calculated in step S903 with the second level setting value Aa calculated in step S906, and sets the larger one of them as a level setting value A that is a target of processing.

In steps S908 to S911, the control unit 101 causes processing to proceed to steps S912 to S915 in accordance with the level setting value A set in step S907.

Steps S912 to S915 are similar to steps S612 to S615 of FIG. 6; the operation restriction indicator 501 displays the number of segments for display corresponding to the level setting value A as the temperature increase level 502.

Next, the calculation method for the first level setting value Am and the second level setting value Aa, which are respectively calculated in step S903 and step S906 of FIG. 9, will be described.

The first level setting value Am is calculated using the following expression 7 from the differential temperature Dm and the display control thresholds Thm stored in the non-volatile memory 116 in advance.

$$\text{When } Thm(n) < Dm \leq Thm(n-1), \quad \text{(Expression 7)}$$
$$Am = n$$
$$\text{When } Dm = Thm(N+1) = 0,$$
$$Am = N+1$$

In the above expression 7, n is an arbitrary natural number, and $1 \leq n \leq N+1$. Furthermore, N is the largest number of segments of the temperature increase level 502, and Thm(N+1)=0.

Similarly, the second level setting value Aa is calculated using the following expression 8.

$$\text{When } Tha(n) < Da \leq Tha(n-1), \quad \text{(Expression 8)}$$
$$Aa = n$$
$$\text{When } Da = Tha(N+1) = 0,$$
$$Aa = N+1$$

In the above expression 8, n is an arbitrary natural number, and $1 \leq n \leq N+1$. Furthermore, N is the largest number of segments of the temperature increase level 502, and Tha(N+1)=0.

A description is now given of an example in which the display control thresholds Thm for the device temperature Tm have been set at an interval of 1° C. as follows: Thm(0)=10° C., Thm(1)=9° C., and Thm(2)=8° C. At certain time t1, provided that the differential temperature Dm related to the device temperature Tm is 9.5° C., Thm(1)<Dm≤Thm(0) holds, and therefore 1 is given as the first level setting value Am (Am=1). Also, at certain time t2, provided that the differential temperature Dm related to the device temperature Tm is 8.5° C., Thm(2)<Dm≤Thm(1) holds, and therefore 2 is given as the level setting value Am.

As described above, the first level setting value Am and the second level setting value Aa are calculated, and the operation restriction indicator 501 is updated through processing of step S907 onward in FIG. 9.

In the present embodiment, the display control thresholds Thm for the device temperature Tm and the display control thresholds Tha for the outer casing temperature Ta are values that are each set separately, and are values that are set in accordance with the temperature increase characteristics of each of the temperatures that are the determination targets. As a result of changing the display control threshold Th0 separately for each of the temperatures that are the determination targets, the display start timing of the operation restriction indicator 501 can be controlled; consequently, the operation restriction indicator 501 can be displayed at a desired timing. Therefore, variations in the display start timing of the operation restriction indicator 501 among a plurality of temperatures can be alleviated.

As described above, according to the second embodiment, the advantageous effects equivalent to those of the first embodiment can be achieved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-203532, filed Dec. 20, 2022 which is hereby incorporated by reference herein in its entirety.

What is claimed is:

1. An electronic apparatus comprising:
   a plurality of thermometers that detect temperatures at a plurality of positions in the electronic apparatus;
   a CPU; and
   a memory which stores a program which, when executed by the CPU, causes the electronic apparatus to function as:
   a control unit that displays, on a display, information relating to a time period until one of the plurality of temperatures detected by the plurality of thermometers reaches a threshold temperature, and performs control to restrict an operation of the electronic apparatus in a case where one of the plurality of temperatures detected by the plurality of thermometers has reached the threshold temperature, wherein the plurality of thermometers include a thermometer that detects a temperature of a heat source included in the electronic apparatus, and a thermometer that detects a temperature of an outer casing of the electronic apparatus, the control unit performs control to obtain a first difference between the temperature of the heat source and a threshold temperature for the temperature of the heat source and a second difference between the temperature of the outer casing and a threshold temperature for the temperature of the outer casing, correct the first difference based on temperature increase characteristics of the heat source, correct the second difference based on temperature increase characteristics of the outer casing, and display the information based on the corrected first difference or the corrected second difference, wherein the control unit performs control to correct the first difference by multiplying the first difference by a first correction value based on the temperature increase characteristics of the heat source, and correct the second difference by multiplying the second difference by a second correction value based on the temperature increase characteristics of the outer casing, and control the display of the information based on one of the corrected first difference and second difference that has a smaller value than the other, and on a predetermined control threshold, and wherein the information includes a plurality of segments indicating a level until one of the plurality of temperatures detected by the plurality of thermometers reaches a threshold temperature, a plurality of values are set as the predetermined control threshold in accordance with the number of segments to be displayed, and the control unit displays the number of segments corresponding to the predetermined control threshold.

2. The electronic apparatus according to claim 1, wherein the first correction value is determined based on the first difference, the threshold temperature for the temperature of the heat source, and a display start time of the information, and the second correction value is determined based on the second difference, the threshold temperature for the temperature of the outer casing, and the display start time of the information.

3. The electronic apparatus according to claim 2, wherein the first correction value and the second correction value are determined based on a ratio between the display start time of the information and an operable time period until one of the plurality of temperatures detected by the plurality of thermometers reaches the threshold temperature.

4. The electronic apparatus according to claim 3, wherein the correction values are determined for each of operation modes of the electronic apparatus.

5. The electronic apparatus according to claim 4, wherein the electronic apparatus is an image capture apparatus, and the operation modes include a plurality of moving image shooting modes.

6. The electronic apparatus according to claim 1, wherein a timing to update the information is changed in accordance with a difference between the plurality of values of the predetermined control threshold.

7. The electronic apparatus according to claim 1, further comprising:

a first heat source; and a second heat source, wherein the plurality of thermometers include a first thermometer that detects a temperature of the first heat source and a second thermometer that detects a temperature of the second heat source, and the first difference includes at least one of a difference between the temperature of the first heat source and a threshold temperature for the temperature of the first heat source, and a difference between the temperature of the second heat source and a threshold temperature for the temperature of the second heat source.

8. The electronic apparatus according to claim 7, wherein the electronic apparatus is an image capture apparatus, the first heat source is the CPU, and the second heat source is an imaging sensor.

9. The electronic apparatus according to claim 1, wherein the plurality of thermometers include a thermometer that detects a temperature for estimating an ambient temperature in an environment in which the electronic apparatus is used, and the threshold temperature for the temperature of the outer casing is calculated based on the estimated ambient temperature.

10. An electronic apparatus comprising:

a plurality of thermometers that detect temperatures at a plurality of positions in the electronic apparatus;

a CPU; and a memory which stores a program which, when executed by the CPU, causes the electronic apparatus to function as:

a control unit that displays, on a display, information relating to a time period until one of the plurality of temperatures detected by the plurality of thermometers reaches a threshold temperature, and performs control to restrict an operation of the electronic apparatus in a case where one of the plurality of temperatures detected by the plurality of thermometers has reached the threshold temperature, wherein the plurality of thermometers include a thermometer that detects a temperature of a heat source included in the electronic apparatus, and a thermometer that detects a temperature of an outer casing of the electronic apparatus, the control unit obtains a first difference between the temperature of the heat source and a threshold temperature for the temperature of the heat source and a second difference between the temperature of the outer casing and a threshold temperature for the temperature of the outer casing, and displays the information based on a first setting value obtained through comparison between the first difference and a predetermined first control threshold or on a second setting value obtained through comparison between the second difference and a predetermined second control threshold, and wherein the information includes a plurality of segments indicating a level until one of the plurality of temperatures detected by the plurality of thermometers reaches the threshold temperature, and the control unit performs control to display the number of segments corresponding to the first setting value or the second setting value.

11. The electronic apparatus according to claim 10, wherein
the control unit performs control to display or update the segments based on the larger one of the first setting value and the second setting value.

12. The electronic apparatus according to claim 10, wherein
the predetermined first control threshold is set based on temperature increase characteristics of the heat source, and the predetermined second control threshold is set based on temperature increase characteristics of the outer casing.

13. The electronic apparatus according to claim 10, further comprising:
a first heat source; and
a second heat source,
wherein the plurality of thermometers include a first thermometer that detects a temperature of the first heat source and a second thermometer that detects a temperature of the second heat source, and
the first difference includes at least one of a difference between the temperature of the first heat source and a threshold temperature for the temperature of the first heat source, and a difference between the temperature of the second heat source and a threshold temperature for the temperature of the second heat source.

14. The electronic apparatus according to claim 13, wherein
the electronic apparatus is an image capture apparatus, and
the first heat source is the CPU, and the second heat source is an imaging sensor.

15. The electronic apparatus according to claim 10, wherein
the plurality of thermometers include a thermometer that detects a temperature for estimating an ambient temperature in an environment in which the electronic apparatus is used, and
the threshold temperature for the temperature of the outer casing is calculated based on the estimated ambient temperature.

16. A control method for an electronic apparatus,
the electronic apparatus including
a plurality of thermometers including a thermometer that detects a temperature of a heat source included in the electronic apparatus, and a thermometer that detects a temperature of an outer casing of the electronic apparatus,
the control method comprising:
displaying, on a display, information relating to a time period until one of the plurality of temperatures detected by the plurality of thermometers reaches a threshold temperature; and
performing control to restrict an operation of the electronic apparatus in a case where one of the plurality of temperatures detected by the plurality of thermometers has reached the threshold temperature,
wherein in the displaying, a first difference between the temperature of the heat source and a threshold temperature for the temperature of the heat source, and a second difference between the temperature of the outer casing and a threshold temperature for the temperature of the outer casing, are obtained, the first difference is corrected based on temperature increase characteristics of the heat source, the second difference is corrected based on temperature increase characteristics of the outer casing, and the information is displayed based on the corrected first difference or the corrected second difference,
wherein in the displaying,
the first difference is corrected by multiplying the first difference by a first correction value based on the temperature increase characteristics of the heat source, and the second difference is corrected by multiplying the second difference by a second correction value based on the temperature increase characteristics of the outer casing,
the information is displayed based on one of the corrected first difference and second difference that has a smaller value than the other, and on a predetermined control threshold,
wherein the information includes a plurality of segments indicating a level until one of the plurality of temperatures detected by the plurality of thermometers reaches a threshold temperature,
a plurality of values are set as the predetermined control threshold in accordance with the number of segments to be displayed, and
in the displaying, the number of segments corresponding to the predetermined control threshold is displayed.

17. A control method for an electronic apparatus,
the electronic apparatus including
a plurality of thermometers including a thermometer that detects a temperature of a heat source included in the electronic apparatus, and a thermometer that detects a temperature of an outer casing of the electronic apparatus,
the control method comprising:
displaying, on a display, information relating to a time period until one of the plurality of temperatures detected by the plurality of thermometers reaches a threshold temperature; and
performing control to restrict an operation of the electronic apparatus in a case where one of the plurality of temperatures detected by the plurality of thermometers has reached the threshold temperature,
wherein in the displaying, a first difference between the temperature of the heat source and a threshold temperature for the temperature of the heat source, and a second difference between the temperature of the outer casing and a threshold temperature for the temperature of the outer casing, are obtained, and the information is displayed based on a first setting value obtained through comparison between the first difference and a predetermined first control threshold or on a second setting value obtained through comparison between the second difference and a predetermined second control threshold,
wherein the information includes a plurality of segments indicating a level until one of the plurality of temperatures detected by the plurality of thermometers reaches the threshold temperature, and
in the displaying, the number of segments corresponding to the first setting value or the second setting value are displayed.

* * * * *